United States Patent Office 3,194,835
Patented July 13, 1965

3,194,835
NEW COLCHICINIC AND THIOCOLCHICINIC DERIVATIVES AND PROCESS OF PREPARATION
Georges Muller, Nogent-sur-Marne, Seine, France, assignor to Roussel-UCLAF, Paris, France, a corporation of France
No Drawing. Filed May 10, 1963, Ser. No. 279,610
Claims priority, application France, May 18, 1962, 898,044; Oct. 30, 1962, 913,881; Jan. 30, 1963, 923,185
11 Claims. (Cl. 260—554)

The present invention relates to the preparation of new colchicinic and thiocolchicinic derivatives as well as the process of their preparation.

The invention more particularly relates to 1-formylated derivatives of colchicines and of thiocolchicines of the following general formula:

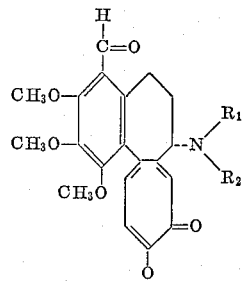

wherein $R_1$ is selected from the group consisting of hydrogen and lower alkyl, $R_2$ is the acyl radical of an organic carboxylic acid, and Z is selected from the group consisting of lower alkoxy, —S-lower alkyl and $$-\underset{Z}{\underset{\downarrow}{S}}\text{-lower alkyl}$$

as well as the process of their preparation.

The new compounds of the invention possess an interesting biological activity. Certain among them, of which particularly are 1-formyl-colchicine and 1-formyl-thiocolchicine, exercise an accentuated anti-mitotic action and can be, on the other hand, used industrially in agriculture for modifications of mitosis and the creation of polyploids either by sprinkling aqueous solutions or suspensions of the products on cultivated soil or by previous treatment of the seeds with the product, either pure or diluted in a solvent or on a support. The remainder of the products have an antimitotic action similar to known colchicinic derivatives.

It is an object of the present invention to produce novel 1-formylated derivatives of colchicinic compounds.

Another object of the invention is the obtention of a colchicinic derivative of the formula:

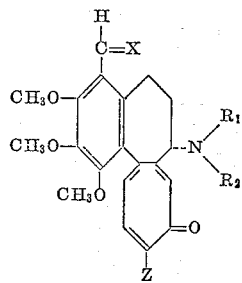

wherein $R_1$ is selected from the group consisting of hydrogen and lower alkyl, $R_2$ is the acyl radical of an organic carboxylic acid, X is selected from the group consisting of =O, =NOH and =N—NHCONH$_2$, and Z is selected from the group consisting of lower alkoxy, —S-lower alkyl and $$-\underset{O}{\underset{\downarrow}{S}}\text{-lower alkyl}$$

and particularly 1-formyl-colchicine and 1-formyl-thiocolchicine.

A further object of the invention is the development of a process for the production of a colchicine derivative of the formula:

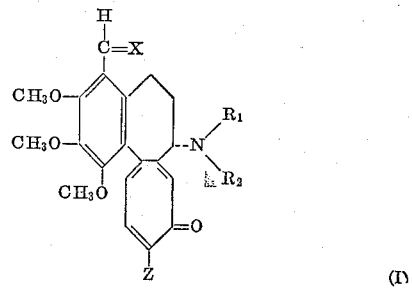

(I)

wherein $R_1$ is selected from the group consisting of hydrogen and lower alkyl, $R_2$ is the acyl radical of an organic carboxylic acid, X is selected from the group consisting of =O, =NOH and =N—NHCONH$_2$, and Z is selected from the group consisting of lower alkoxy, —S-lower alkyl and $$-\underset{O}{\underset{\downarrow}{S}}\text{-lower alkyl}$$

which comprises the steps of reacting 1,1-dichloromethyl methyl ether with a compound of the formula:

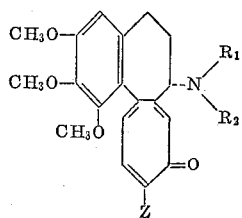

(II)

wherein $R_1$, $R_2$ and Z have the above assigned values, in the presence of an anhydrous inert organic solvent and a catalyst selected from the group consisting of stannic chloride and aluminum chloride, decomposing the complex formed by the addition of water and recovering said colchicinic derivative.

These and other objects of the invention will become more apparent as the description thereof proceeds.

Unexpectedly, it was found that the action of 1,1-dichloromethyl methyl ether on colchicines and thiocolchicines, as indicated above, in the presence of an appropriate catalyst leads to a selective formylation of the 1-position of the colchicinic compound without provoking a degradation of its complex structure, although the reaction is conducted in an acid media, or without provoking parasitic substitution on the C ring.

It is believed without wishing to be bound by theoretical considerations that the reaction proceeds according to the partial flow diagram hereafter:

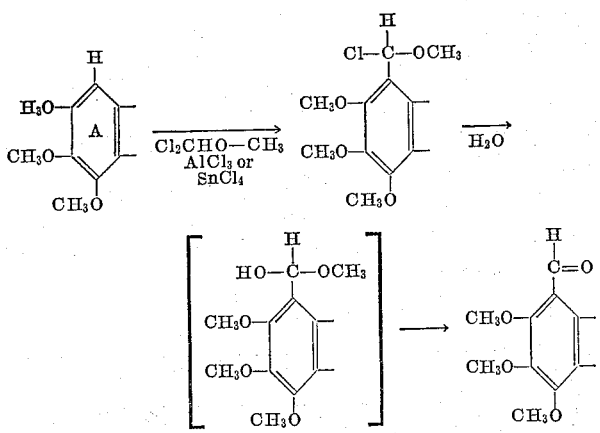

The process according to the invention is characterized essentially in that 1,1-dichloromethyl methyl ether is made to react on a colchicine or a thiocolchicine compound of the formula:

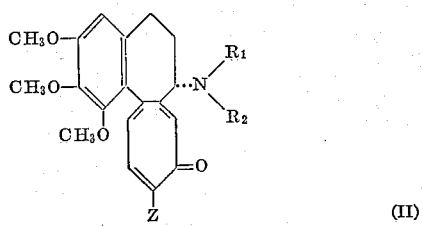

wherein $R_1$ is selected from the group consisting of hydrogen and lower alkyl, $R_2$ is the acyl radical of an organic carboxylic acid, and Z is selected from the group consisting of lower alkoxy,

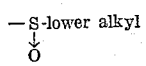

and —S-lower alkyl, while operating in an appropriate anhydrous inert organic solvent and in the presence of a catalyst selected from the group consisting of stannic chloride and aluminum chloride. Thereafter water is added to decompose the reaction complex and the product formed is isolated according to known procedures.

The starting compounds for the process are those colchicinic derivatives containing a trimethoxylated aromatic A ring of the formula:

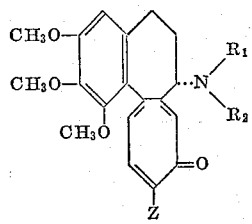

wherein $R_1$ is selected from the group consisting of hydrogen and lower alkyl, $R_2$ is the acyl radical of an organic carboxylic acid, and Z is selected from the group consisting of lower alkoxy, —S-lower alkyl and

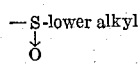

The acyl radical of an organic carboxylic acid is preferentially derived from hydrocarbon carboxylic acids having from 1 to 8 carbon atoms such as acetic acid, propionic acid and benzoic acid. Among the preferred starting compounds are colchicine (II, $R_1$=H, $R_2$=COCH$_3$ and Z=OCH$_3$) and thiocolchicine (II, $R_1$=H, $R_2$=COCH$_3$, Z=SCH$_3$). Other colchicinic compounds may be employed, however, such as sulfoxyalted thiocolchicine (II, $R_1$=H, $R_2$=COCH$_3$, Z=SCH$_3$)
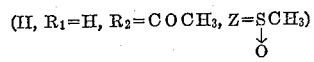

etc.

The reaction can be conducted at room temperature or in the neighborhood of room temperature. The best catalyst appears to be stannic chloride. However, aluminum chloride allows also the obtention of the products.

As anhydrous inert organic solvents, one can advantageously employ chlorinated alkane solvents, preferably, methylene chloride or chloroform.

The reaction duration is generally between 1 to 18 hours, after which the reaction complex is decomposed with water and the formulated derivative is isolated by the usual procedures, particularly by extraction with a solvent, as for example, methylene chloride, followed by removal of the solvent by distillation under vacuum.

In the case of difficulty crystallizable products, they can be isolated by the formation of insoluble derivatives such as the semicarbazone or the oxime, which can later be decomposed by acid hydrolysis with such acids as pyruvic acid, hydrochloric acid, etc.

The following examples illustrate the invention without, however, limiting it. It is to be understood that other equivalent expedients known to those skilled in the art may be employed.

EXAMPLE I

1-formyl colchicine (I, $R_1$=H, $R_2$=COCH$_3$, X=O, and Z=OCH$_3$)

1.02 gm. of colchicine were dissolved in 10 cc. of methylene chloride and 0.8 cc. of stannic chloride were added thereto. The formation of an abundant yellow precipitate was observed and the temperature increased to 50° C.

The reaction mixture was cooled to room temperature and 2.5 cc. of 1,1-dichloromethyl methyl ether were added thereto. The precipitate changed color and became red.

The reaction mixture was allowed to stand for 2 hours at room temperature. Then water and methylene chloride were added thereto. The mixture was triturated in order to decompose the complex and extracted with methylene chloride. The methylene chloride extracts were washed with water and evaporated to dryness under vacuum.

1.10 gm. of raw 1-formyl-colchicine were obtained which was crystallized from ethyl acetate. (Yield: 70–80%.) Instantaneous melting point 250° C.

The product occurred in the form of colorless crystals soluble in chloroform, slightly soluble in ethyl acetate and insoluble in water and ether.

The structure of 1-formyl-colchicine was proven by the nuclear magnetic resonance spectra.

By comparison with numerous colchicinic derivatives, the

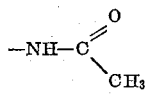

and OCH$_3$ functions and especially the proton functions in the $C_1$, $C_9$, $C_{12}$ and $C_{13}$, and $C_{16}$ positions were located. By comparison to these known products, there was found in 1-formyl-colchicine the two complexed protons, $C_{12}$+$C_{13}$, and characteristic protons in the $C_9$ and $C_{16}$ positions. By contrast, the proton in the $C_1$ position which is located at 370 Hz had disappeared. In addition, a new aldehydic proton at 592 Hz was found.

*Analysis.* — $C_{23}H_{26}O_7N$; molecular weight=427.44. Calculated: C, 64.62%; H, 5.90%; N, 3.28%. Found: C, 64.4%; H, 6.0%; N, 3.2%.

This compound is not described in the literature.

EXAMPLE II

*Preparation of the oxime of 1-formyl colchicine*

(I, $R_1$=H, $R_2$=COCH$_3$, X=NOH, Z=OCH$_3$)

1.1 gm. of hydroxylamine chloride, 14.5 cc. of ethanol and 5 gm. of 1-formyl-colchicine were introduced at room temperature into a solution of 650 mg. of sodium hydroxide in 6 cc. of water. The yellow solution so obtained was allowed to stand for a period of 4 hours at room temperature. It was next poured into water. The aqueous solution was extracted with methylene chloride. The methylene chloride extracts were washed with water, dried over magnesium sulfate, filtered and distilled to dryness under vacuum.

The residue was redissolved in ethyl acetate. Ether was added thereto and the solution was allowed to stand at 0° C. for a period of one hour. The precipitate was vacuum filtered, washed with an ethyl acetate-ether mixture and dried.

4.11 gm. of the oxime of 1-formyl-colchicine were obtained, being a yield of 81%.

The product occurred in the form of yellow crystals, soluble in chloroform, acetone, ethanol and dilute aqueous acids and alkalis, and very slightly soluble in ether, benzene and water. The product had a melting point of 190°–200° C. and a specific rotation $[\alpha]_D^{20}$=+246°±2° (c.=0.5% in chloroform).

*Analysis.*—$C_{23}H_{26}O_7N_2$; molecular weight=442.45. Calculated: C, 62.43%; H, 5.92%; N, 6.33%. Found: C, 62.4%; H, 6.1%; N, 6.1%.

This compound is not described in the literature.

EXAMPLE III

*1-formyl-thiocolchicine*

(I, $R_1$=H, $R_2$=COCH$_3$, X=O, Z=SCH$_3$)

1.19 gm. of thiocolchicine were dissolved in 8 cc. of methylene chloride and 0.8 cc. of stannic chloride were added thereto. This addition produced a solidification in the reaction mixture which became red and the temperature increased to about 50° C. The reaction mixture was cooled to room temperature and 2.5 cc. of 1,1-dichloromethyl methyl ether were added thereto. The reaction was continued for a period of 3 hours and a evolution of hydrochloric acid was observed. The reaction mixture was then poured on ice. The precipitate was triturated with water and methylene chloride. The resultant mixture was extracted with methylene chloride. The combined methylene chloride phases were washed with water and with sodium bicarbonate solution, filtered and evaporated to dryness under vacuum.

1.21 gm. of raw 1-formyl-thiocolchicine were obtained which was purified by the formation of the oxime or the semicarbazone.

1-formyl-thiocolchicine is not described in the literature.

EXAMPLE IV

*Oxime of 1 formyl-thiocolchicine*

(I, $R_1$=H, $R_2$=COCH$_3$, X=NOH, Z=SCH$_3$)

2 gm. of anhydrous sodium acetate in 30 cc. of ethanol were heated to reflux. 1 gm. of hydroxylamine chloride, then 500 mg. of raw 1-formyl-thiocolchicine, obtained in Example III, were added and the reaction mixture was maintained at reflux for a period of an hour and thirty minutes.

Next the mixture was cooled to room temperature. Water was added thereto and the aqueous solution extracted with methylene chloride. The extracts were washed with water, filtered and distilled to dryness under vacuum.

The residue obtained was dissolved in methylene chloride. The solution was reduced to a small volume and ethyl acetate was added thereto causing a precipitate.

400 mg. of the oxime of 1-formyl-thiocolchicine were obtained having a melting point of about 210° C. with decomposition whose constants did not change by further recrystallization.

The product occurred in the form of yellow crystals, soluble in chloroform, slightly soluble in ethyl acetate and insoluble in water and ether.

*Analysis.*—$C_{23}H_{26}O_6N_2S$; molecular weight=458.53. Calculated: C, 60.24%; H, 5.72%; N, 6.11%; S, 6.99%. Found: C, 60.5%; H, 5.9%; N, 5.9%; S, 6.9%.

This compound is not described in the literature.

EXAMPLE V

*Semicarbazone of 1-formyl-thiocolchicine*

(I, $R_1$=H, $R_2$=COCH$_3$, X=N—NHCONH$_2$, Z=SCH$_3$)

400 mg. of anhydrous sodium acetate in 10 cc. of ethanol were heated to reflux. 200 mg. of semicarbazide hydrochloride, then 110 mg. of raw 1-formyl-thiocolchicine, obtained in Example III, were added. Reflux was maintained for a period of an hour and thirty minutes.

The reaction mixture was iced, water added thereto and the mixture was extracted with methylene chloride. The methylene chloride extracts were concentrated to a small volume. The semicarbazone of 1-formyl-thiocolchicine obtained was vacuum filtered (yield 80%). The product had a melting point of about 210° C. with decomposition.

The product occurred in the form of yellow crystals, slightly soluble in chloroform and insoluble in water and ether.

*Analysis.*—$C_{24}H_{28}O_6N_4S$; molecular weight=500.56. Calculated: C, 57.58%; H, 5.63%; N, 11.20%; S, 6.40%. Found: 57.3%; H, 5.8%; N, 11.2%; S, 6.5%.

This compound is not described in the literature.

The preceding examples are illustrative of the invention. It is to be understood, however, that such changes and modifications as would occur to one skilled in the art may be employed without departing from the spirit of the invention or the scope of the appended claims.

I claim:

1. A colchicinic derivative of the formula:

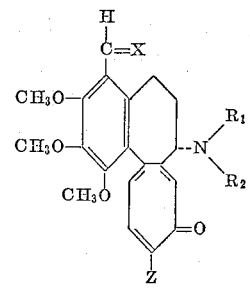

wherein $R_1$ is selected from the group consisting of hydrogen and lower alkyl, $R_2$ is the acyl radical of an organic carboxylic acid selected from the group consisting of alkanoic acid having 1 to 8 carbon atoms and benzoic acid, X is selected from the group consisting of =O, =NOH and =N—NHCONH$_2$ and Z is selected from the group consisting of lower alkoxy, and —S-lower alkyl.

2. 1-formyl-colchicine.

3. 1-formyl-thiocolchicine.

4. A process for the production of a colchicinic derivative of the formula:

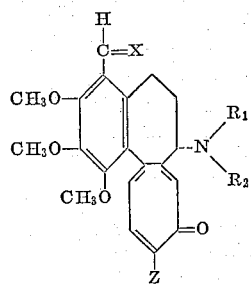

wherein $R_1$ is selected from the group consisting of hydrogen and lower alkyl, $R_2$ is the acyl radical of an organic carboxylic acid selected from the group consisting of alkanoic acid having 1 to 8 carbon atoms and benzoic acid, X is selected from the group consisting of =O, =NOH and =N—NHCONH$_2$, and Z is selected from the group consisting of lower alkoxy, and —S-lower alkyl, which comprises the steps of reacting 1,1-dichloromethyl methyl ether with a compound of the formula:

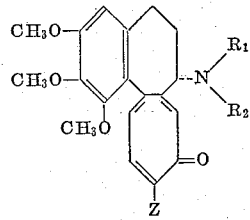

wherein $R_1$, $R_2$ and Z have the above assigned values, in the presence of an anhydrous inert organic solvent and a catalyst selected from the group consisting of stannic chloride and aluminum chloride, decomposing the complex formed by the addition of water and recovering said colchicinic derivative.

5. The process of claim 4 wherein said solvent is a chlorinated alkane.

6. The process of claim 8 wherein said chlorinated alkane is selected from the group consisting of methylene chloride and chloroform.

7. A process of producing 1-formyl-colchicine which comprises the steps of reacting 1,1-dichloromethyl methyl ether with colchicine in the presence of an anhydrous chlorinated alkane solvent and a catalyst selected from the group consisting of stannic chloride and aluminum chloride, decomposing the complex formed by the addition of water and recovering said 1-formyl-colchicine.

8. A process of producing 1-formyl-thiocolchicine which comprises the steps of reacting 1,1-dichloromethyl methyl ether with thiocolchicine in the presence of an anhydrous chlorinated alkane solvent and a catalyst selected from the group consisting of stannic chloride and aluminum chloride, decomposing the complex formed by the addition of water and recovering said 1-formyl-thiocolchicine.

9. 1-oximidomethyl-colchicine.
10. 1-oximidomethyl-thiocolchicine.
11. 1-semicarbazidomethyl-thiocolchicine.

References Cited by the Examiner

Muller et al.: Ann., volume 66g (1963), pages 105–13 at pages 108–10.

NICHOLAS S. RIZZO, Primary Examiner.

UNITED STATES PATENT OFFICE
CERTIFICATE OF CORRECTION

Patent No. 3,194,835                       July 13, 196

Georges Muller

It is hereby certified that error appears in the above numbered patent requiring correction and that the said Letters Patent should read as corrected below.

Column 1, lines 19 to 30, for that portion of the formula reading

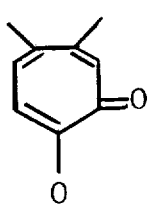      read      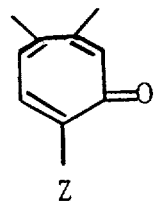

same column 1, lines 36 to 38, the formula should appear as shown below instead of as in the patent:

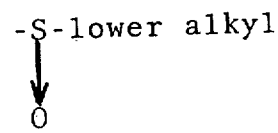

column 4, line 24, for "difficulty" read -- difficultly --; column 8, line 8, for the claim reference numeral "8" read -- 5 --.

Signed and sealed this 26th day of April 1966.

(SEAL)
Attest:

ERNEST W. SWIDER  
Attesting Officer

EDWARD J. BRENNER  
Commissioner of Patent